3,313,787
UNSATURATED HYDROCARBON COPOLYMERS COMPRISING AT LEAST ONE ALPHA-OLEFIN AND AN ALKENYL SUBSTITUTED ACETYLENE AND PROCESS FOR PREPARING SAME
Alberto Valvassori, Guido Sartori, and Vittorio Turba, Milan, Italy, assignors to Montecatini Edison S.p.A., Milan, Italy
No Drawing. Filed Apr. 29, 1964, Ser. No. 363,590
Claims priority, application Italy, Apr. 30, 1963, 8,949/63
38 Claims. (Cl. 260—79.5)

This invention is directed to substantially linear, amorphous, unsaturated high-molecular weight copolymers and to the process of preparing said copolymers by means of catalysts which function through an anionic coordination type mechanism. The preparation of amorphous, unsaturated copolymers obtained by copolymerizing one or more olefinic monomers including ethylene and the higher alpha-olefins with conjugated, non-conjugated, linear or cyclic dienes or polyenes have been described in the copending applications Ser. Nos. 151,206 filed on Nov. 9, 1961, 231,031 filed on Oct. 16, 1962, 261,523 filed on Feb. 27, 1963, 273,316 filed on Apr. 16, 1963, and 274,852 filed on Apr. 22, 1963.

Each monomer unit derived from the polymerization of the dienes or polyenes, as mentioned above, retains one or more free unsaturations in the chain of the copolymer such that the copolymer can be vulcanized with sulfur containing compositions of the type conventionally used for the vulcanization of unsaturated rubber. Thus, by means of vulcanization it is possible to transform these copolymers into products having good elastomeric properties. There is disclosed in copending application Ser. No. 668,291, filed on June 27, 1957, a method of preparing copolymers in the presence of catalysts obtained from transition metal compounds and an organometallic compound. These copolymers are amorphous unsaturated copolymers of ethylene with at least one alphaolefin and an acetylenic type monomer having the general formula CH≡C—R, wherein R is either a hydrogen, an alkyl or an aryl radical. These monomers polymerize by opening of the acetylenic bond and were found to contain a free double bond in the macromolecule so that the copolymer can be vulcanized with sulfur compositions. These monomers possess, however, a mobile hydrogen atom in close proximity to the acetylenic bond which has a tendency to interact with the catalyst, thus, decelerating or even inhibiting the activity of the catalyst.

It has been discovered, in accordance with this invention, that the above-mentioned problems can be avoided by copolymerizing ethylene with at least one alphaolefin and an acetylenic monomer having the general formula R'—C≡C—R" wherein R' is an alkyl, cycloalkyl, alkylcycloalkyl, aryl or alkylaryl group having at least one terminal vinyl group or an aliphatic or cycloaliphatic group which may contain one or more aryl groups and one or more unsaturations and has at least one terminal vinyl group, and R" being the same as R' or is an alkyl, cycloalkyl, alkylcycloalkyl, aryl or alkylaryl group. These acetylenic monomers were found not to interact with the catalyst or its components during the polymerization. Consequently, it is possible to obtain unsaturated products whose macromolecules are made up of monomer units derived from each of the monomers used in the copolymerization. The acetylenic monomers of this invention contain, not only triple internal bonds, but also contain double bonds since they have at least one unsaturation of the vinyl type. Each monomer unit derived from the polymerization of said monomers retains one or more free unsaturations in the polymer chain. In fact, the infrared spectrum of the copolymers of this invention showed adsorption bands due to the presence of triple bonds, i.e. approximately 4.50 micron band. When monomers having only one vinyl group are employed, however, practically no bands due to the presence of a vinyl group were present in the absorption spectrum of the copolymer. This indicates that polymerization of the acetylenic monomer takes place by opening the vinyl double bond rather than by opening the acetylenic bond.

A number of specific examples of acetylenic monomers which can be used for purposes of this invention include hexen-1-yne-4(allylmethyl-acetylene), octadiene-1-7-yne-4(diallyl acetylene), butenylmethyl-acetylene, allylethyl-acetylene, allylcyclohexylacetylene, 5-phenylpenten-1-yne-4-(allylphenylacetylene), allyl betanaphthylacetylene, 1-propynyl 4-penten-4'-inyl-1'-benzene, allyl-α-naphthylacetylene, allyl-p-tolyl-acetylene, ethylbuten-3'-yl-acetylene, allyl-2'-4'-xylyl-acetylene. Of the many monomers, the preferred include acetylenic monomers wherein the terminal vinyl bond or bonds are non-conjugated with respect to the internal unsaturation or unsaturations. Particularly good results are obtained by employing acetylenic monomers wherein at least one acetylenic bond is in an alpha-beta position with respect to an aromatic nucleus such as, for example, allylphenyl-acetylene.

The olefins to be used in preparing the copolymers, in addition to the use of ethylene, include the alphaolefin of the general formula RCH=$CH_2$, wherein R is an alkyl group containing one to six carbon atoms. In practice, particularly good results are obtained by polymerizing one of the above-mentioned acetylenic monomers with ethylene, propylene and/or butene-1. It is possible, for example, by copolmerizing a mixture of ethylene, propylene and/or butene-1 with allylphenylacetylene to obtain a crude polymerizate comprising unsaturated macromolecules wherein there were present, randomly distributed, monomeric units of ethylene, propylene and allylphenylacetylene. The infrared spectrographic analysis of these copolymers indicated the presence of phenyl nuclei (6.2 and 6.70 micron bands) and triple bonds (bands at about 4.5 microns) whereas there were no absorption bands due to the presence of vinyl groups. This analysis demonstrates that the polymerization of the acetylenic monomer takes place substantially by opening of the vinyl double bond.

The catalysts employed in this invention are dispersed, colloidally dispersed or completely dissolved in a hydrocarbon which can be employed as the copolymerization solvent. These solvents include, for instance, the aliphatic, cycloaliphatic and the aromatic hydrocarbons or mixtures thereof.

The catalysts are prepared from organometallic compounds of aluminum, beryllium, or lithium-aluminum and vanadium compounds. More specifically, the organometallic compounds used for preparing the catalyst include aluminum trialkyls, aluminum dialkylmonohalides, aluminum monoalkyldihalides, aluminum alkyl sesquihalides, aluminum alkenyls, aluminum alkylenes, aluminum cycloalkyls, aluminum cycloalkylalkyls, aluminum aryls, aluminum alkylaryls, or complexes of the above-mentioned aluminum organic compounds with preferably weak Lewis bases, lithium-aluminum tetra-alkyls, beryllium dialkyls, beryllium alkylhalides, and beryllium diaryls.

In addition, organometallic compounds may be employed wherein the metal is linked by the main valence not only to carbon or halogen atoms but also to oxygen atoms attached to an organic group. These include, for example, the aluminum dialkylalkoxides and the aluminum alkylalkoxyhalides. Other examples of organometallic compounds to be used in preparing the catalyst include aluminum triethyl, aluminum triisobutyl, aluminum trihexyl, aluminum diethylmonochloride, aluminum diethylmonoiodide, aluminum diethylmonofluoride, aluminum di-isobutylmonochloride, aluminum monoethyldichloride, aluminum ethyl sesquichloride, aluminum butenyldiethyl, aluminum isohexenyldiethyl, 2-methyl-1,4-di(di-isobutyl aluminum)butane, aluminum tri(cyclopentylmethyl), aluminum tri(dimethyl-cyclopentylmethyl), aluminum triphenyl, aluminum tritolyl, aluminum di(cyclopentylmethyl)monochloride, aluminum diphenyl monochloride, aluminum di-isobutylmonochloride complexed with anisole, beryllium diethyl, beryllium methylchloride, beryllium dimethyl, beryllium di-n-propyl, beryllium di-isopropyl, beryllium di-n-butyl, beryllium di-t.butyl, lithium-aluminum tetra-hexyl, lithium-aluminum tetra-butyl, lithium-aluminum tetra-octyl, aluminum monochloromonoethylmonoethoxide, aluminum diethylpropoxide, aluminum diethyl-amyloxide, aluminum monochloromonopropylmonopropoxide, aluminum monochloromonopropylmonoethoxide.

As for the vanadium compounds, it is preferred to use those compounds which are soluble in the hydrocarbons used as the copolymerization medium. These compounds include, for example, the halides and oxyhalides, such as $VCl_4$, $VOCl_3$ and $VBr_4$. In addition, other vanadium compounds include those in which at least one of the metal valences is saturated by an ether atom, e.g. oxygen or nitrogen linked to an organic group. Examples of these vanadium compounds include vanadium triacetylacetonate, and tribenzoylacetonate, vanadyl diacetylacetonate, halogenacetylacetonates, trialcoholates and haloalcoholates, vanadium tri- and tetrachloride and vanadyl trichloride tetrahydrofuranates, etherates, aminates, pyridinates and quinolinates. In addition, vanadium compounds which are insoluble in hydrocarbons can be used and include the organic salts such as vanadium triacetate, tribenzoate and tristearate.

Of the many catalysts, it has been found that in order to obtain the best result, it is necessary to operate in the presence of a halogen-containing catalyst system, wherein at least one of the components contains at least one halogen atom. The temperature of the copolymerization of this invention may range from about $-80°$ C. to $125°$ C. To produce high-copolymer yields per unit weight of catalyst used, it is important to prepare the catalyst and to carry out the copolymerization at temperatures ranging from about $0°$ C. to a $-80°$ C. and more preferably at a temperature ranging from a $-10°$ C. to a $-50°$ C. This range of temperatures is particularly preferred in those instances where the catalysts are prepared from a halogen-containing organometallic compound and a vanadium compound such as vanadium triacetylacetonate, vanadyl diacetylacetonate and halogen-acetylacetonates or in general from vanadium compounds such as $VCl_4$ and $VOCl_3$. By operating under these conditions, the catalysts were found to be more active than those catalysts prepared at the higher temperatures. Moreover, by operating in the low temperature range, the activity of the catalyst remained practically unaltered with time.

If the catalyst is to be prepared from an aluminum alkylhalide and a vanadium triacetylacetonate, vanadyl trialcoholate, or vanadyl haloalcoholate at temperatures ranging from about $0°$ C. and $125°$ C., it is advisable to operate in the presence of a complexing agent. These agents include the ethers, thioethers, tertiary amines and the trisubstituted phosphines having at least one branched alkyl group or an aromatic nucleus. The use of these complexing agent with the catalysts results in a higher copolymer yield. The complexing agent may be an ether having the formula RYR', wherein Y is oxygen or sulfur and R and R' represent a linear or branched alkyl group containing from 1 to 14 carbon atoms or an aromatic nucleus containing from 6–14 carbon atoms, but at least one of the R or R' is a branched alkyl group or an aromatic nucleus.

In addition, the complexing agent may be a tertiary amine of the formula:

wherein R, R' and R" represent an alkyl group containing 1–14 carbon atoms or an aromatic nucleus containing 6–14 carbon atoms, but at least one of the R's being an aromatic nucleus. Further, the complexing agent can be a tertiary phosphine having the formula:

wherein R, R' and R" designate an alkyl radical containing 1–14 carbon atoms or an aromatic nucleus containing 6–14 carbon atoms with at least one of the R's being an aromatic nucleus. The amount of complexing agent to be used ranges between 0.05 to 1 mol per mol of aluminum alkylhalide.

The activity of the catalyst in the polymerization process varies according to the molar ratio of the compounds used in preparing the catalyst. Thus, it has been found that by using, for example, aluminum trialkyl and vanadium halides or oxyhalides, it is necessary to employ catalysts wherein the molar ratio of the aluminum trialkyl to vanadium compound ranges from 1–5 and preferably from 2–4. However, when employing an aluminum diethylmonochloride, $Al(C_2H_5)_2Cl$, and vanadium triacetylacetonate, $VAc_3$, the best results were obtained with the molar ratio of the $Al(C_2H_5)_2Cl/VAc_3$ ranging from 2 to 20 and preferably from 4–10.

The copolymerization can be carried out in the presence of an aliphatic, cycloaliphatic or aromatic hydrocarbon solvent including, for example, butane, pentane, n-heptane, cyclohexene, toluene, xylene and mixtures thereof. In addition, inert halogenated hydrocarbons can be used which include, for example, methylene chloride, chloroform, trichloroethylene, tetrachloroethylene, chlorobenzenes, dichloroethanes, etc. Considerably high copolymerization yields were obtained when the copolymerization was carried out without the use of an inert solvent and with the monomers in the liquid state. In other words, a mixture of ethylene, an alphaolefin and a hydrocarbon containing both double and triple bonds can be used without a solvent if they are in the liquid state. Particularly good results are obtained with monomers having only one vinyl group.

In order to obtain highly homogeneous copolymers, it is advisable to maintain the ratio between the concentration of the monomers to be copolymerized constant or at least as near constant as possible. Thus, the copolymerization may be conducted advantageously by continuously feeding and discharging a mixture of the monomers in the liquid phase. The copolymerization is carried out by maintaining the mixture of monomers constant and by operating at high spatial rates. It is obvious, therefore, that by varying the composition of the monomer mixture the composition of the final copolymer may be varied over a wide range. Thus, for example, if an amorphous terpolymer of an acetylenic monomer with ethylene and propylene are desired, it is necessary to maintain a molar ratio of ethylene/propylene in the reaction liquid phase, below or at most equal to 1:4, which corresponds to a molar ratio of ethylene to propylene in the gas phase of 1:1 under normal conditions. Preferred molar ratios in the liquid phase range between 1:200 and 1:4. In case butene-1 is employed in place of propylene, the molar ratio between ethylene and butene-1 must be below or at most equal to 1:20 with the corresponding molar ratio of ethylene to butene-1 in the gas phase being 1:1.5 under normal conditions. Here, the preferred molar ratios, in the liquid phase, range from about 1:1000 and 1:20. By following these reaction conditions amorphous terpolymers containing less than approximately 75% by mols of ethylene can be obtained. If these ratios are exceeded, the terpolymer will exhibit crystallinity of the polyethylenic type. Though the lower limit of the ethylene content is not critical, but it is preferred to have the terpolymer contain at least 5% by mols of ethylene. The alphaolefin content in the amorphous terpolymers may vary from a minimum of about 5% by mols up to a maximum of about 95% by mols. The acetylenic monomer content in the terpolymer may range from about 0.1 to 20% by mols. The upper limit may be increased but it is not advisable particularly for economical reasons to introduce the acetylenic monomer content in an amount in excess of 20% by mols. If, however, binary amorphous copolymers of ethylene and an acetylenic monomer are desired, the content of the acetylenic monomer must exceed 25% by mols. If in place of ethylene, an alphaolefin is used in the binary copolymer there is no critical upper limit for the olefin content. There is no crystallinity when the alphaolefin content is relatively high, e.g. in excess of 75–80% by mols.

The copolymers of this invention exhibit a substantial linear structure as indicated by the fact that their viscosity behavior is practically identical to that known for other linear copolymers such as the linear copolymers of ethylene and alphaolefins. The molecular weight of these copolymers, viscosimetrically determined, is above 20,000 which corresponds to an intrinsic viscosity measured in tetrahydronaphthalene at 135° C. or in toluene at 30° C. higher than 0.5. The intrinsic viscosity of the copolymers may range from about 0.5 to 10 and in some cases higher values can be obtained. For most applications, however, copolymers having intrinsic viscosities in the range of 1 to 5 are preferred.

The amorphous copolymers of this invention have properties typical of non-vulcanized elastomers in the sense that they possess low initial elastic moduli and very high ultimate tensile strengths. The unsaturations present in the macromolecules of the copolymers constitute reactive centers for subsequent reactions. They can, for instance, be partially or totally utilized in oxidation processes to supply, e.g., by reaction with ozone, polar groups and in particular carboxylic groups which in turn constitute reactive groups for subsequent reactions including, for example, vulcanization with polyvalent basic substances and to serve as a means of improving the adhesive properties of the copolymer. In addition, the unsaturations permit vulcanization of the copolymer with sulfur-containing compositions. By following the techniques normally employed in curing unsaturated rubbers, and more particularly low unsaturated rubbers such as butyl rubber, well vulcanized products having good elastomeric characteristics can be obtained. This is evidenced by the fact that the copolymers possess a very homogeneous structure and that the unsaturations are distributed well along the polymer chain. The vulcanizates, unlike the copolymers that are soluble in boiling n-heptane, are completely insoluble in organic solvents such as the aliphatic hydrocarbons and will swell only to a limited degree in certain aromatic solvents.

The vulcanizates have been found to exhibit high ultimate tensile strength, low residual-set after breaking and a high reversible elastic elongation particularly when the composition contains a reinforcing filler such as carbon black. The copolymers may be extended or plasticized with hydrocarbon oils by techniques per se known. Paraffinic and naphthenic oils are preferred although aromatic oils may be used. The elastomers obtained by vulcanizing the copolymers may be employed for various purposes because of their high mechanical characteristics in shaping articles such as pipes, plates, sheets, tapes, inner tubes, etc.

The following examples are merely illustrations of the products and process of this invention.

EXAMPLE 1

The reaction apparatus comprises a glass cylinder having a diameter of 5.5 cm. and a capacity of 750 cc. which is provided with a stirrer and an inlet and outlet gas tube. The reaction apparatus is immersed in a thermostatic bath at −20° C. The inlet gas tube reaches the bottom of the cylinder and ends in a porous plate 3.5 cm. diameter. 200 cc. of anhydrous n-heptane and 15 cc. of allylphenylacetylene were introduced into the reactor held in a nitrogen atmosphere. A propylene-ethylene gaseous mixture having a molar ratio of 2:1 was passed through the gas inlet tube and circulated at a rate of 200 N l./h. The catalyst was performed in a 100 cc. flask at a temperature of −20° C. under a nitrogen atmosphere by reacting 0.5 millimol of vanadium tetrachloride and 2.5 millimols of aluminum diethylmonochloride in 30 cc. of anhydrous n-heptane. The preformed catalyst was siphoned into the reactor by means of a nitrogen pressure. The propylene-ethylene gaseous mixture was continuously fed and discharged at a rate of 450 N l./h.

After 1 hour and 50 minutes, the reaction was stopped by the addition of 20 cc. of methanol containing 0.1 g. of phenyl-beta-naphthylamine. The product was purified in a separatory funnel under a nitrogen atmosphere by means of repeated treatments with diluted hydrochloric acid and then with water and coagulated in acetone.

After vacuum drying, 6 g. of solid product were obtained. The product was amorphous at the X-rays and appeared like an unvulcanized elastomer and was completely soluble in boiling n-heptane. The intrinsic viscosity of the copolymer determined in toluene at 30° C. was 1.3. The infrared spectrographic analysis showed the presence of phenyl groups (6.25 and 6.70 micron bands) and acetylenic bonds (4.5 micron bands). The molar ratio of ethylene to propylene was about 1.

100 parts by weight of the ethylene-propylene-allylphenyl-acetylene terpolymer were mixed in a laboratory roll mill with the following ingredients:

| | Parts by weight |
|---|---|
| Phenyl-beta-naphthylamine | 1 |
| Sulphur | 2 |
| Zinc oxide | 5 |
| Tetramethyl-thiuram disulphide | 1 |
| Mercaptobenzothiazole | 0.5 |

The mixture was vulcanized in a press for 60 minutes at 150° C. The vulcanized sheet obtained had the following characteristics:

| | |
|---|---|
| Ultimate tensile strength | 51 kg./cm.$^2$ |
| Elongation at break | 820%. |
| Modulus at 300% | 10.5 kg./cm.$^2$ |
| Permanent set at break | 16%. |

EXAMPLE 2

200 cc. of anhydrous n-heptane and 2 cc. of allylmethylacetylene were introduced into the same reaction apparatus as described in Example 1 and held at a constant temperature of −20° C. A gaseous mixture of propylene and ethylene having a molar ratio of 2:1 was passed into the gas inlet tube and circulated at a rate of 20 N l./h. The catalyst was prepared by operating at −20° C. by reacting 4 millimols of vanadium tetrachloride and 20 millimols of aluminum diethylmonochloride in 30 cc. of n-heptane in a 100 cc. flask held in a nitrogen atmosphere. The catalyst was siphoned into the reactor by means of a nitrogen pressure. The propylene-ethylene gaseous mixture was continuously fed and discharged at a rate of 200 N l./h. After 40 minutes the reaction was stopped by the addition of 20 cc. of methanol which contained 0.1 g. of phenyl-beta-naphthylamine. The product was purified and isolated as described in Example 1. After vacuum drying, 14.5 g. of a solid product was obtained which was amorphous at the X-rays and had the characteristics of an unvulcanized elastomer which was completely soluble in boiling n-heptane.

The infrared spectrum of this copolymer indicated an absorption band at 4.50 microns, due to the presence of acetylenic bonds. The molar ratio of ethylene to propylene was equal to 1. 100 parts by weight of the ethylene-propylene-allylmethylacetylene terpolymer were vulcanized with the same composition and by the same procedure as described in Example 1. A vulcanized sheet having the following characteristics was obtained:

Ultimate tensile strength _____ 30 kg./cm.$^2$
Elongation at break _____ 900%.
Modulus at 300% _____ 13 kg./cm.$^2$

EXAMPLE 3

200 cc. of anhydrous n-heptane and 20 cc. of allyl-phenyl-acetylene were introduced into the same reaction apparatus described in Example 1 and held at the constant temperature of −20° C. A gaseous propylene-ethylene stream having a molar ratio of 1.75 to 1 was sent in and circulated at a rate of 475 N l./h. through the gas inlet tube. The catalyst was preformed by reacting 0.5 millimol of vanadium tetrachloride and 2.5 millimols of aluminum diethylmonochloride in 30 cc. of anhydrous n-heptane in a 100 cc. flask held under nitrogen atmosphere at a constant temperature of −20° C. The catalyst was then siphoned into the reactor by means of nitrogen pressure. The gaseous ethylene-propylene stream was continuously fed and discharged at a rate of 475 N l./h. After one hour, the reaction was stopped by the addition of 20 cc. of methanol which contained 0.1 g. of phenyl-beta-naphthylamine. The product was purified and isolated as described in Example 1. After vacuum drying, 7 g. of solid product was obtained which was amorphous at the X-rays, completely soluble in boiling n-heptane and looked like an unvulcanized elastomer. The intrinsic viscosity of the copolymer, as measured in toluene at 30° C., was 1.4. The infrared spectrographic examination indicated the presence of phenyl groups (bands at 6.20 and 6.70 microns) and acetylenic bonds (band at 4.50 microns). The molar ratio of ethylene to propylene was approximately 1.2 to 1. 100 parts by weight of the ethylene-propylene-allylphenylacetylene terpolymer was vulcanized with the same composition and by the same procedure described in Example 1.

A vulcanized sheet having the following characteristics was obtained:

Ultimate tensile strength _____ 35 kg./cm.$^2$.
Elongation at break _____ 480%.
Modulus at 300% _____ 12 kg./cm.$^2$.
Residual set after break _____ 8%.

EXAMPLE 4

200 cc. of anhydrous n-heptane and 15 cc. of allyl-phenylacetylene were introduced into the same reaction apparatus as described in Example 1 and held at the constant temperature of −20° C. A gaseous propylene-ethylene stream having a molar ratio of 2:1 was circulated into the reaction apparatus through the gas inlet tube at a rate of about 200 N l./h. The catalyst was prepared by reacting 0.5 millimol of vanadium tetrachloride and 2.5 millimols of aluminum trihexyl in 30 cc. of anhydrous n-heptane in a 100 cc. flask under nitrogen atmosphere and at the constant temperature of −20° C. The catalyst was then siphoned into the reactor by means of nitrogen pressure. The ethylene-propylene gaseous mixture was continuously fed and discharged at a rate of 200 N l./h. After two hours, the reaction was stopped by the addition of 20 cc. of methanol which contained 0.1 g. of phenyl-beta-naphthylamine. The product was purified and isolated following the procedure of Example 1. After vacuum drying 3 g. of solid product were obtained which was amorphous at the X-rays and had the characteristics of an unvulcanized elastomer and was completely soluble in boiling n-heptane.

The intrinsic viscosity of the copolymer was 1.7. The infrared spectrographic analysis showed the presence of phenyl groups (bands at 6.20 and 6.70 microns) and acetylenic bonds (band at 4.50 microns). The molar ratio of ethylene to propylene was equal to 1. The ethylene-propylene-allylphenylacetylene terpolymer was vulcanized with the mixture and by the same procedure described in Example 1. A product having mechanical characteristics similar to the products of the preceding examples was obtained.

EXAMPLE 5

200 cc. of anhydrous n-heptane and 15 cc. of allyl-phenylacetylene were introduced into the reaction apparatus of Example 1 and held at the constant temperature of −20° C. A gaseous propylene-ethylene stream having a molar ratio of 2:1 was sent in and circulated through the reaction apparatus by means of the gas inlet tube at a rate of 200 N l./h. The catalyst was prepared by reacting 1 millimol of vanadium tetrachloride and 2.5 millimols of aluminum trihexyl in 30 cc. of anhydrous n-heptane in a 100 cc. flask held under a nitrogen atmosphere at a constant temperature of −20° C. The catalyst was then siphoned into the reactor by means of nitrogen pressure.

The gaseous ethylene-propylene stream was fed continuously and discharged at a rate of 200 N l./h. After one hour and 30 minutes, the reaction was stopped by the addition of 20 cc. of methanol which contained 0.1 g. of phenyl-beta-naphthylamine. The product was purified and isolated by means described in Example 1. After vacuum drying, 2.5 g. of solid product were obtained which was amorphous at the X-rays, had the characteristics of an unvulcanized elastomer and was completely soluble in boiling n-heptane.

The intrinsic viscosity of the product was 1.6. The infrared spectrographic examination showed the presence of phenyl groups (bands at 6.20 and 6.70 microns) and acetylenic bonds (band at 4.50 microns). The molar ratio of ethylene to propylene was equal to about 1. 100 parts by weight of the ethylene-propylene-allylphenyl-acetylene terpolymer were vulcanized with the same composition and by the same process as described in Example 1. A vulcanized sheet having the following characteristics was obtained:

Ultimate tensile strength _____ 52 kg./cm.$^2$.
Elongation at break _____ 580%.
Modulus at 300% _____ 20 kg./cm.$^2$.

EXAMPLE 6

200 cm.$^3$ of anhydrous n-heptane and 2 cm.$^3$ allylethyl-acetylene were introduced in the same apparatus as described in Example 1 and held at the constant temperature of −20° C. A gaseous ethylene-propylene mixture having a molar ratio of 2:1 was sent through the gas inlet tube and circulated at a rate of 200 N l./h. The catalyst was prepared by reacting 4 millimols of vanadium tetrachloride and 20 millimols of aluminum diethylmonochloride in 50 cm.$^3$ n-heptane in a 100 cm.$^3$ flask in a nitrogen atmosphere at a temperature of −20° C. The catalyst was then siphoned into the reactor by means of nitrogen pressure. The propylene-ethylene gaseous mixture was continuously fed and discharged at a rate of 200 N l./h. After 45 minutes, the reaction was stopped by the addition of 20 cm.$^3$ methanol which contained 0.1 g. of phenyl-beta-naphthylamine. The product was purified and isolated as described in Example 1. After vacuum drying, 14.5 g. of solid product were obtained which was amorphous at the X-rays and completely soluble in boiling n-heptane and had the characteristics of an unvulcanized elastomer. The infrared spectrographic examination indicated the presence of acetylenic bonds (band at 4.5 microns). The ethylene-propylene ratio was about 1:1. 100 parts by weight of the terpolymer was vulcanized with the same mixture and by the same procedure as described in Example 1. A vulcanized sheet having the following characteristics was obtained:

Tensile strength _____ 28 kg./cm.$^2$.
Elongation at break _____ 860%.
Modulus at 300% _____ 14 kg./cm.$^2$.

EXAMPLE 7

200 cm.$^3$ anhydrous n-heptane and 20 cm.$^3$ allylbeta-naphthylacetylene were introduced into the same apparatus as described in Example 1 and held at the constant temperature of −20° C. A propylene-ethylene gaseous mixture having the molar ratio of 1.5:1 was sent through the gas inlet tube and circulated at a rate of 200 N l./h. The catalyst was prepared under nitrogen atmosphere at −20° C. by reacting 0.5 millimol of vanadium tetrachloride and 2.5 millimols of aluminum diethylmonochloride in 30 cm.$^3$ of anhydrous n-heptane in a 100 cm.$^3$ flask. The catalyst was then siphoned into the reactor under nitrogen pressure. The ethylene-propylene gaseous mixture was continuously fed and discharged at a rate of 200 N l./h. After one hour, the reaction was stopped by adding 20 cm.$^3$ of methanol which contained 0.1 g. of phenyl-beta-naphthylamine. The product was purified and isolated as described in Example 1. After vacuum drying, 6 g. of solid product were obtained which was amorphous at the X-rays, completely soluble in boiling n-heptane and had the characteristics of an unvulcanized elastomer.

The product had an intrinsic viscosity, as determined in toluene at 30° C., of 1.6. The infrared examination revealed the presence of phenyl groups. The ethylene-propylene molar ratio was about 1.3:1. The copolymer was vulcanized with the same composition and by the same procedure as described in Example 1. A vulcanized sheet having the following characteristics was obtained:

Tensile strength _____ 32 kg./cm.$^2$.
Elongation at break _____ 630%.
Modulus at 300% _____ 13 kg./cm.$^2$.

While this invention has been described with respect to a number of specific embodiments, it is obvious that there are many other modifications and variations which can be made without departing from the spirit of the invention, except as more particularly pointed out in the appended claims.

What is claimed is:

1. A susbtantially linear, amorphous, unsaturated high-molecular weight copolymer of at least one acetylenic monomer and at least one monomer selected from the group consisting of ethylene and an aliphatic alphaolefin having the general formula R—CH=CH$_2$, wherein R is an alkyl group of 1 to 6 carbon atoms; said acetylenic monomer characterized by the formula R′—C≡C—R″ wherein R′ is either an alkyl, cycloalkyl, alkylcycloalkyl, aryl, or alkylaryl group having at least one terminal vinyl group or an aliphatic, cycloaliphatic or alkylcycloaliphatic group having at least one terminal vinyl group and R″ being the same as R′ or an alkyl, cycloalkyl, alkylcycloalkyl, aryl or alkylaryl group; said copolymers consisting of macromolecules having unsaturations and comprising monomer units derived from each of the monomers.

2. The high molecular weight copolymers of claim 1 further characterized in that R′ is either an aliphatic, cycloaliphatic or alkylcycloaliphatic group having at least one aryl group and at least one unsaturation with at least one terminal vinyl group.

3. The high molecular weight copolymer of claim 1 further characterized in that R″ is the same as R′.

4. A substantially linear, amorphous, unsaturated high molecular weight copolymer consisting of macromolecules of units of at least one monomer selected from the group consisting of ethylene and aliphatic alphaolefins having the general formula of R—CH=CH$_2$ wherein R is an alkyl group of 1 to 6 carbon atoms and of at least one monomer selected from the group consisting of allylmethylacetylene, allylphenylacetylene, allylethyl-acetylene and allylbetanaphthylacetylene.

5. The copolymer of claim 4 further characterized as consisting of macromolecules of units of ethylene, propylene and at least one monomer selected from the group consisting of allylmethylacetylene, allylphenylacetylene, allylethylacetylene and allylbetanaphthylacetylene.

6. A process for preparing the substantially linear, amorphous, unsaturated high molecular copolymers of claim 1 which comprises polymerizing a mixture of said monomers in the presence of an effective amount of a catalyst consisting of the reaction product of a vanadium compound and an organometallic compound.

7. The process of claim 6 further characterized in that the organometallic compound is an aluminum compound.

8. The process of claim 6 further characterized in that the organometallic compound is a beryllium compound.

9. The process of claim 6 further characterized in that the organometallic compound is a lithium-aluminum compound.

10. The process of claim 6 further characterized in that the vanadium compound is a hydrocarbon-soluble vanadium compound.

11. The process of claim 10 further characterized in that the hydrocarbon-soluble vanadium compound is selected from the group consisting of vanadium halides, vanadium oxyhalides and vanadium compounds wherein at least one of the metal valences is saturated by a hetero-atom linked to an organic group.

12. The process of claim 11 further characterized in that the hetero-atom is oxygen.

13. The process of claim 11 further characterized in that the hetero-atom is nitrogen.

14. The process of claim 6 further characterized in that the catalyst is prepared with a vanadium compound selected from the group consisting of vanadium tetrachloride, vanadium tetrabromide, vanadyl trichloride, vanadium triacetylacetonate, vanadium tribenzoylacetonate, vanadyl diacetylacetonate, vanadyl haloacetylacetonate, vanadyl trialcoholates, vanadyl haloalcoholates, vanadyl tetrahydrofuranates, vanadyl etherates, vanadyl aminates, pyridinates, quinolinates of vanadium tri- and tetrachloride, and vanadyl trichloride.

15. The process of claim 6 further characterized in that the catalyst is prepared from a hydrocarbon-insoluble vanadium compound selected from the group consisting of vanadium triacetate, vanadium tribenzoate, and vanadium tristearate.

16. The process of claim 6 further characterized in that the organometallic compound is selected from the group consisting of lithium-aluminum tetra-alkyls, beryllium dialkyls, beryllium alkylhalides, beryllium diaryls, aluminum trialkyls, aluminum dialkylmonohalides, aluminum monoalkyldihalides, aluminum alkylsesquihalides, aluminum alkenyls, aluminum alkylenes, aluminum cycloalkyls, aluminum cycloalkylalkyls, aluminum aryls, aluminum alkylaryls, and aluminum compounds wherein the aluminum is linked to oxygen atoms linked to an organic group.

17. The process of claim 16 further characterized in that the organometallic compound is an aluminum compound wherein the aluminum is linked to oxygen atoms linked to an organic group.

18. The process of claim 17 further characterized in that the organometallic compound is an aluminum compound selected from the group consisting of aluminum dialkylalkoxides and aluminum dialkylalkoxyhalides.

19. The process of claim 16 further characterized in that the organoaluminum compound is a complex of a weak Lewis base.

20. The process of claim 6 further characterized in that the catalyst is prepared by the reaction of a hydrocarbon-soluble compound of vanadium and a halogen-containing organometallic compound of a metal selected from the group consisting of aluminum, beryllium, and lithiumaluminum.

21. The process of claim 6 further characterized in that the catalyst is prepared by the reaction of a halogen-free vanadium compound and a halogen-containing organometallic compound of a metal selected from the group consisting of aluminum and beryllium.

22. The process of claim 6 further characterized in that the polymerization is carried out at a temperature ranging from about −80° C. to +125° C.

23. The process of claim 22 further characterized in that the polymerization is carried out at a temperature ranging from 0° C. to −80° C.

24. The process of claim 22 further characterized in that the catalyst is prepared at a temperature ranging from 0° C. to −80° C.

25. The process of claim 6 further characterized in that the catalyst is prepared from vanadium compounds selected from the group consisting of vanadium triacetylacetonate, vanadyl trialcoholates, and vanadyl haloalcoholates and an aluminum alkylhalide at a temperature ranging from about 0° C. to +125° C. in the presence of a complexing agent.

26. The process of claim 25 further characterized in that the complexing agent is selected from the group consisting of ethers, thioethers, tertiary amines, and trisubstituted phosphines.

27. The process of claim 26 further characterized in that the complexing agent is present in the polymerization reaction in an amount ranging from about 0.05 to 1 mole per mole of the aluminum alkylhalide.

28. The process of claim 6 further characterized in that the catalyst is prepared from an aluminum trialkyl and a vanadium compound selected from the group consisting of vanadium halides and vanadium oxyhalides, wherein the molar ratio of the aluminum compound to the vanadium compound ranges from 1 to 5.

29. The process of claim 6 further characterized in that the catalyst is prepared from aluminum diethylmonochloride and vanadium triacetylacetonate wherein the molar ratio of the aluminum compound to the vanadium compound ranges from 2 to 20.

30. The process of claim 6 further characterized in that the polymerization takes place with the monomers in the liquid state.

31. The process of claim 6 further characterized in that the polymerization takes place in the presence of an inert solvent.

32. The process of claim 31 further characterized in that the polymerization takes place in the presence of at least one solvent selected from the group consisting of aliphatic, cycloaliphatic and aromatic hydrocarbons.

33. The process of claim 31 further characterized in that the inert solvent is a halogenated hydrocarbon.

34. The process of claim 6 further characterized in that the polymerization is continuously carried out by continuously adding the catalyst to the reaction while maintaining the ratio of the monomers in the liquid phase constant.

35. The process of claim 6 further characterized in that the acetylenic monomer is copolymerized with ethylene and propylene with the molar ratio of the ethylene to propylene in the liquid phase being equal to or less than 1:4.

36. The process of claim 6 further characterized in that the copolymer is prepared with an acetylenic monomer, ethylene and butene-1 with the molar ratio of ethylene to butene-1 in the liquid phase being at least equal to or less than 1:20.

37. An elastomer obtained by vulcanizing the copolymers of claim 1.

38. The elastomers of claim 37 further characterized as being in the form of pipes, inner tubes, sheets or plates.

No references cited.

JOSEPH L. SCHOFER, *Primary Examiner.*

W. HOOVER, *Assistant Examiner.*